Oct. 27, 1925.  
A. W. STEWART  
VENTILATION SYSTEM  
Filed May 25, 1923  
1,559,057  
2 Sheets-Sheet 1
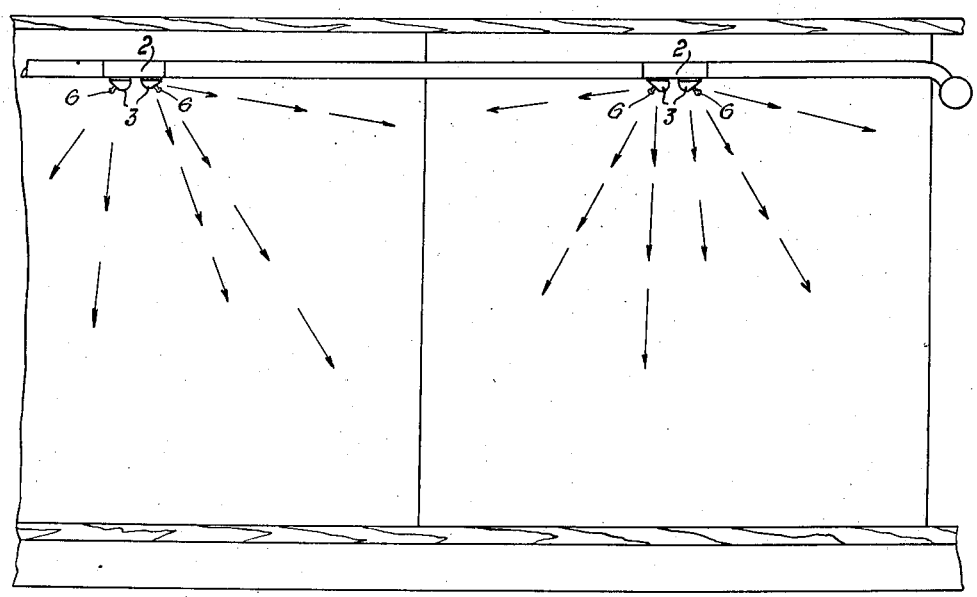
FIG.1.
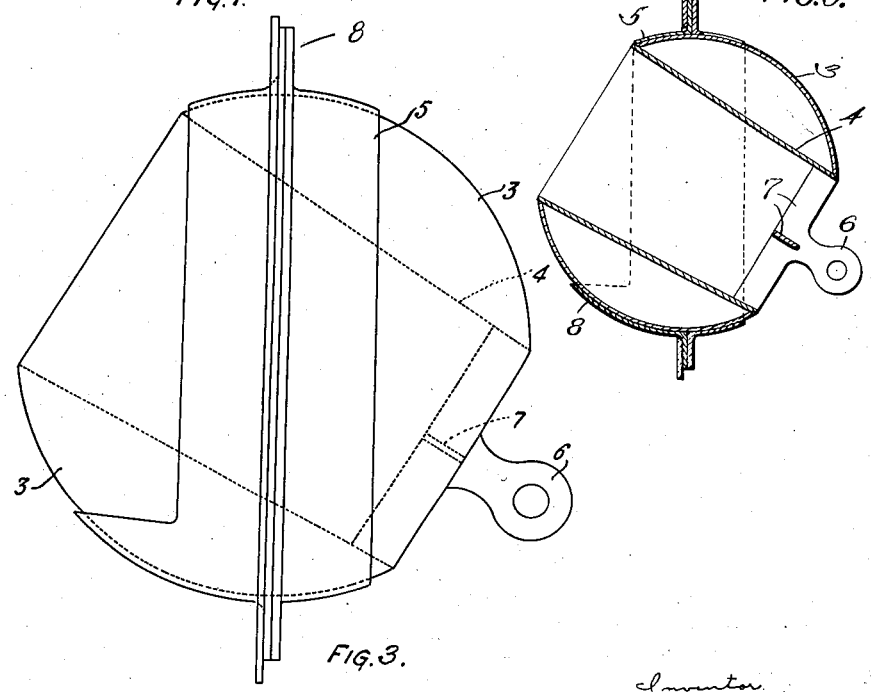
FIG.3.
FIG.5.

Oct. 27, 1925.

A. W. STEWART 1,559,057

VENTILATION SYSTEM

Filed May 25, 1923 — 2 Sheets-Sheet 2

Inventor
Alexander William Stewart
By Pennie, Davis, Marvin & Edmonds
Attorneys

Patented Oct. 27, 1925.

1,559,057

UNITED STATES PATENT OFFICE.

ALEXANDER WILLIAM STEWART, OF GLASGOW, SCOTLAND.

VENTILATION SYSTEM.

Application filed May 25, 1923. Serial No. 641,405.

*To all whom it may concern:*

Be it known that I, ALEXANDER WILLIAM STEWART, a subject of the King of the United Kingdom of Great Britain and Ireland, and residing at Glasgow, Scotland, have invented a certain new and useful Improvement in Ventilation Systems, of which the following is a specification.

This invention relates to a ventilation system in which air at high velocity is delivered through trunking and has for an object to render practicable reduction in the dimensions of the distribution trunking ordinarily required.

This object is realized by the employment as the outlet of a valve in the form of a hollow ball having a through opening and adjustable in a ball socket, permitting the transmission of air at a much higher velocity than is practicable with the employment of louvres of the ordinary hit and miss or slide types on account of the liability for noises to be set up at the edges of the openings.

The ball is formed as a hollow spherical shell having opposite poles cut away to afford an inlet at one pole and an outlet at the other. The ball is supported in a socket formed or fitted into any of the walls of an air duct, air box, or the like. The ball may be adjusted to any position within the range of a hemisphere as by means of a handle at the outlet pole. A tube extending through the ball may be fitted to connect the inlet and outlet poles.

The described arrangement makes it possible to project a stream of air from the air duct in any direction covering a spherical radius of about 180°.

One or more balls may be fitted to a cap at the delivery end or other point of a duct leading to a ship's cabin or the like.

Figure 2:
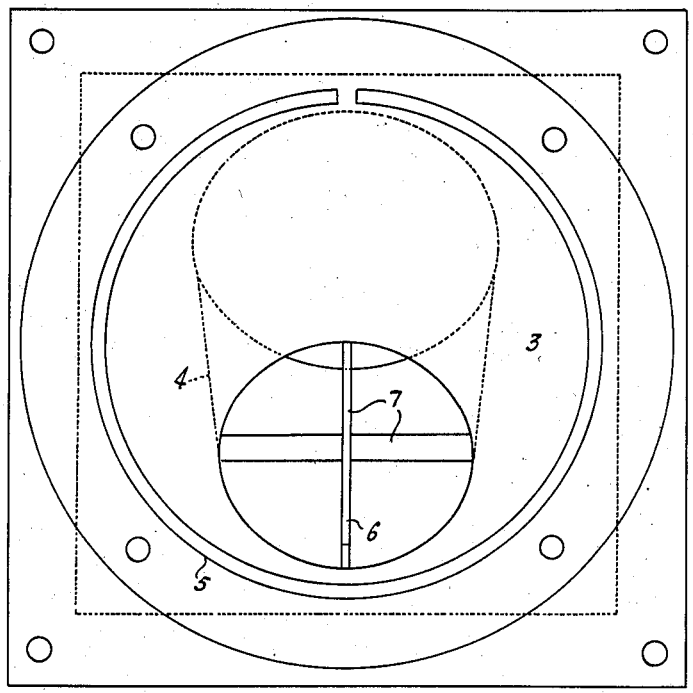
Figure 4:
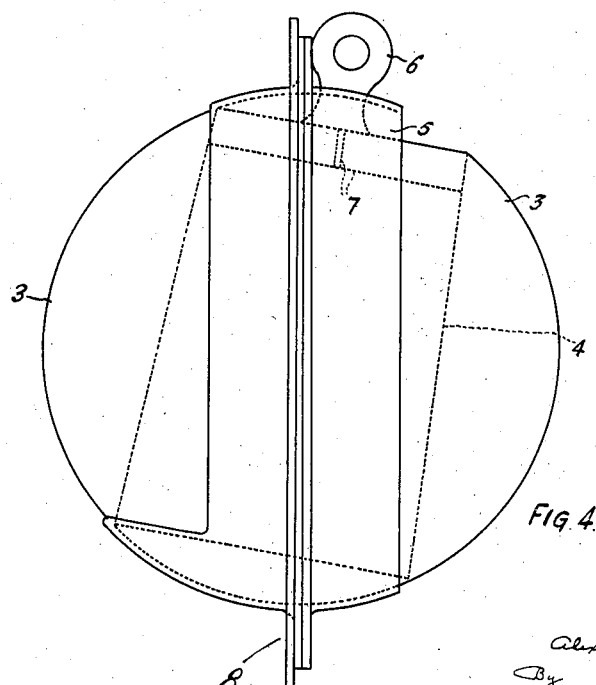

In the accompanying drawings Fig. 1 illustrates diagrammatically part of an installation for the ventilation of ships' cabins or the like. Fig. 2 is an end elevation of the valve. Figs. 3 and 4 are elevations at right angles to Fig. 2 showing the ball in two different positions. Fig. 5 is a section through the valve in the position shown in Fig. 2.

Referring to the drawings, 1 denotes a duct serving a number of ships' cabins and fitted within the cabins with air boxes 2 each fitted with a number of valves, say two valves. Each such valve comprises a ball 3 formed as a hollow spherical shell with opposite poles cut away and connected by a tube 4. The ball is supported in a socket 5 having an extension valve seat 8 and may be adjusted to any position within the range of a hemisphere by means of a handle 6 carried by a spider 7 at the outlet end of the tube 4. The extension valve seat 8 is provided on the socket 5 so that the ball valve can completely shut off the air flow, as shown in Fig. 4.

What I claim is:—

1. In a ventilation system, the combination of an air duct, an air box fitted to said duct and an outlet valve for said air-box discharging directly into the atmosphere, said valve comprising a ball socket and a valve proper in the form of a hollow spherical shell having cut away portions adjustable in said socket, said shell being adjustable to any position substantially within the range of a hemisphere without affecting the discharge through the valve.

2. In a ventilation system, the combination of an air duct, an air box fitted to said duct and an outlet valve for said air-box discharging directly into the atmosphere, said valve comprising a ball socket and a valve proper in the form of a hollow spherical shell having cut away portions joined by a tube and adjustable in said socket, said shell being adjustable to any position substantially within the range of a hemisphere.

In testimony whereof I have signed my name to this specification.

ALEXANDER WILLIAM STEWART.